US010139788B2

(12) United States Patent
Dutta et al.

(10) Patent No.: US 10,139,788 B2
(45) Date of Patent: Nov. 27, 2018

(54) REMOTE DATA ANALYTICS TO PREDICT SYSTEM COMPONENTS OR DEVICE FAILURE

(71) Applicant: Honeywell International Inc., Morris Plains, NJ (US)

(72) Inventors: Manas Dutta, Bangalore (IN); Praveen Shetty, Bangalore (IN); Ramesh Babu Koniki, Bangalore (IN); Praveen Gurrapu, Hyderabad (IN); Mahesh Kumar Gellaboina, Kurnool (IN); Sreedhara Mallavarpu, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 242 days.

(21) Appl. No.: 15/071,104

(22) Filed: Mar. 15, 2016

(65) Prior Publication Data

US 2017/0269562 A1 Sep. 21, 2017

(51) Int. Cl.
*G05B 13/02* (2006.01)
*G06F 15/18* (2006.01)
*G05B 13/04* (2006.01)
*G05B 23/02* (2006.01)

(52) U.S. Cl.
CPC ....... *G05B 13/048* (2013.01); *G05B 23/0229* (2013.01)

(58) Field of Classification Search
CPC .................................................. G05B 13/048
USPC .......................................................... 700/29
See application file for complete search history.

(56) References Cited

U.S. PATENT DOCUMENTS

| 4,048,481 | A | 9/1977 | Bailey, Jr. |
| 6,456,928 | B1 | 9/2002 | Johnson |
| 6,684,349 | B2 | 1/2004 | Gullo |
| 8,204,717 | B2 | 6/2012 | McLaughlin |
| 2005/0021311 | A1 | 1/2005 | Deb et al. |
| 2007/0088570 | A1 | 4/2007 | Shetty et al. |
| 2007/0239753 | A1 | 10/2007 | Leonard |
| 2007/0294591 | A1* | 12/2007 | Usynin ..................... G06F 1/30 714/45 |
| 2011/0046842 | A1 | 2/2011 | Smith |
| 2011/0118905 | A1 | 5/2011 | Mylaraswamy et al. |
| 2013/0231904 | A1* | 9/2013 | Jones ..................... G06F 17/18 703/2 |

(Continued)

FOREIGN PATENT DOCUMENTS

| JP | 2014153736 A | 8/2014 |
| KR | 101561026 B1 | 10/2015 |

OTHER PUBLICATIONS

Notification of Transmittal of the International Search Report and the Written Opinion of the International Searching Authority, or the Declaration dated May 19, 2017 in connection with International Patent Application No. PCT/US2017/016936.

*Primary Examiner* — Suresh Suryawanshi

(57) ABSTRACT

An apparatus includes a memory and one or more processors operably connected to the memory. The one or more processors are configured to receive data collected from a process facility system, detect anomalies for field device or process failures associated with the process facility system that are not monitored by alarms, detect leading indicators for field device or process failures that are monitored by alarms, and monitor the process facility system to detect further anomalies and leading indicators before failures occur.

20 Claims, 5 Drawing Sheets

(56) References Cited

U.S. PATENT DOCUMENTS

| | | | | |
|---|---|---|---|---|
| 2014/0129688 A1* | 5/2014 | Asenjo | .................... | H04L 43/04 |
| | | | | 709/221 |
| 2014/0200686 A1* | 7/2014 | Madam | .............. | G05B 23/0229 |
| | | | | 700/52 |
| 2014/0336791 A1* | 11/2014 | Asenjo | ................ | G05B 13/026 |
| | | | | 700/44 |
| 2014/0351642 A1* | 11/2014 | Bates | .................. | G06F 11/0709 |
| | | | | 714/26 |
| 2015/0294595 A1* | 10/2015 | Hu | ....................... | G06Q 10/101 |
| | | | | 434/127 |
| 2016/0239756 A1* | 8/2016 | Aggour | .............. | G05B 23/0229 |
| 2016/0282847 A1* | 9/2016 | Germann | ............ | G05B 19/4065 |
| 2016/0364456 A1* | 12/2016 | Trenchard | ......... | G06F 17/30477 |
| 2017/0111212 A1* | 4/2017 | Alam | ....................... | H04B 3/58 |

* cited by examiner

REMOTE DATA ANALYTICS TO PREDICT SYSTEM COMPONENTS OR DEVICE FAILURE

TECHNICAL FIELD

This disclosure is generally directed to industrial process control and automation systems. More specifically, this disclosure is directed to remote data analytics to predict system components or device failure.

BACKGROUND

Plant maintenance is common in process industries due to unplanned failure of control system components and devices. Maintenance departments plan preventive maintenance of all critical system components and devices in order to prevent such unplanned plant maintenance but preventive maintenance does not guarantee complete elimination of spurious trips.

Traditionally preventive maintenance is scheduled based on calendar time or run time. Research suggests that only eighteen percent of assets have an age-related failure pattern, while eighty two percent exhibit a random pattern. This data shows that preventive maintenance provides a benefit for only eighteen percent of assets, while missing the other eighty two percent possibly resulting in failures.

SUMMARY

This disclosure provides an apparatus and method for remote data analytics for system components or device failures.

In a first embodiment, an apparatus is provided. The apparatus includes a memory and one or more processor operably connected to the memory. The one or more processors are configured to receive data collected from a process facility system, detect anomalies for field device or process failures associated with the process facility system that are not monitored by alarms, detect leading indicators for field device or process failures that are monitored by alarms, and monitor the process facility system to detect further anomalies and leading indicators before failures occur.

In a second embodiment, a method is provided. The method includes receiving data collected from a process facility system. The method further includes detecting anomalies for field device or process failures associated with the process facility system that are not monitored by alarms. The method also includes detecting leading indicators for field device or process failures that are monitored by alarms. In addition, the method includes monitoring the process facility system to detect further anomalies and leading indicators before failures occur.

In a third embodiment, a non-transitory computer readable medium is provided. The non-transitory computer readable medium encoded with executable instructions that, when executed, cause one or more processors to receive data collected from a process facility system, detect anomalies for field device or process failures associated with the process facility system that are not monitored by alarms, detect leading indicators for field device or process failures that are monitored by alarms, and monitor the process facility system to detect further anomalies and leading indicators before failures occur.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Remote data analytics can help predict control system or device failures before occurring, such as by identifying what part of the system is going to fail, identifying the cause of a forthcoming failure, and identifying the priority of the impending failure. The data analytics reduce downtime once a failure happens by identifying the root cause quickly, recommending recovery procedures, and assisting in bringing the process facility's system up and running again. Other benefits of remote data analytics include improving availability, reliability, safety, and productivity; reducing the maintenance cost, due to predictive maintenance over preventative maintenance; reducing the unplanned shutdowns due to control system failures; improving failure prediction and reducing issue resolution time; reducing human dependency in service of the process facility; and providing on-demand availability of contextual knowledge to resolve issues.

Figure 1:
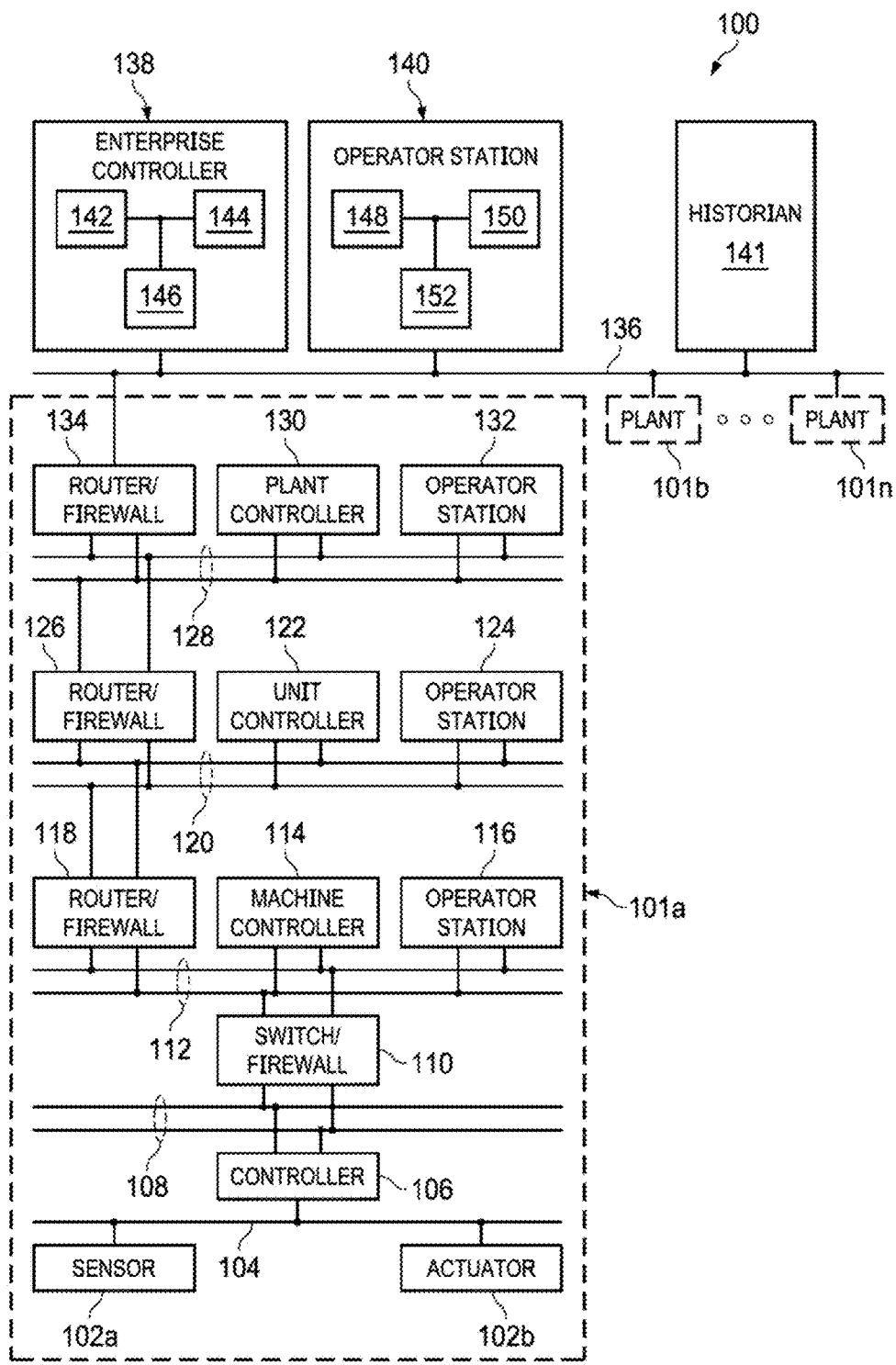
FIG. 1 illustrates an example industrial control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, various components of the system 100 support a process for remote data analytics to predict system component or device failure in the system 100. For example, the controllers 106 may represent field device controllers, and the process elements 102a-102b may represent field devices. One or more components, such as the operator stations 116, 124, 132, 140 or the controllers 106, 114, 122, 130, 138, may perform one or more processes for remote data analytics. Additional details regarding this functionality are provided below.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

Figure 2:
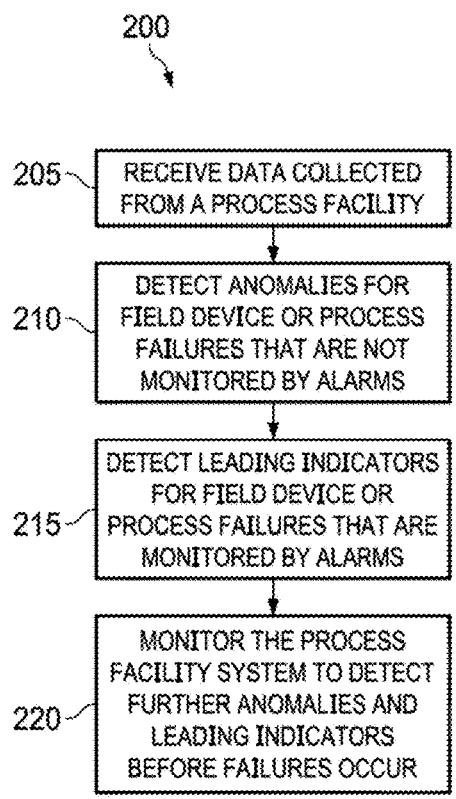
FIG. 2 illustrates an example method for remote data analytics to predict system component or device failure according to this disclosure.

FIG. 2 illustrates an example method 200 for remote data analytics to predict system component or device failure according to this disclosure. For ease of explanation, the method 200 is described with respect to the process facility system 100 shown in FIG. 1. In particular, the method 200 is described as being performed by the controller 138. However, the method 200 could be used in any suitable system and performed by any suitable device(s) or component(s).

In operation 205, the controller 138 receives data collected from a process facility, such as the plant 101a. The data is collected from some or all of the sensors 102a located in the plant 101a. The controller 106 at the plant 101a can collect the data from each of the sensors 102a at different time intervals depending on the versatility of the measurement of the sensor 102a.

In operation 210, the controller 138 detects anomalies in the measurement readings from sensors for field device or process failures that are not monitored by alarms. An anomaly is detected when a measurement from a sensor is outside a threshold for normal behavior of a piece of equipment or a process. The controller 138 uses an unsupervised learning method to determine which parameters identify anomalies that suggest a piece of equipment or process is not functioning appropriately, such as the unsupervised learning method 600 discussed in FIG. 6.

In operation 215, the controller 138 detects leading indicators for field device or process failures that are monitored by alarms. Leading indicators are used to identify changes in measurements that could possibly lead to an alarm or failure. The controller 138 uses a supervised learning method to determine leading indicators, such as the supervised learning method 700 discussed in FIG. 7.

In operation 220, the controller 138 monitors the process facility system, such as plant 101a, to detect further anomalies and leading indicators before failures occur. The controller 138 can also transmit a normal behavior distribution or leading indicators to controller 106, machine controller 114, unit controller 122, or plant controller 130 for localized failure monitoring.

Although FIG. 2 illustrates one example of a method 200 for remote data analytics to predict system component or device failures, various changes may be made to FIG. 2. For example, while shown as a series of steps, various steps shown in FIG. 2 could overlap, occur in parallel, or occur multiple times. Moreover, some steps could be combined or removed and additional steps could be added.

Figure 3:
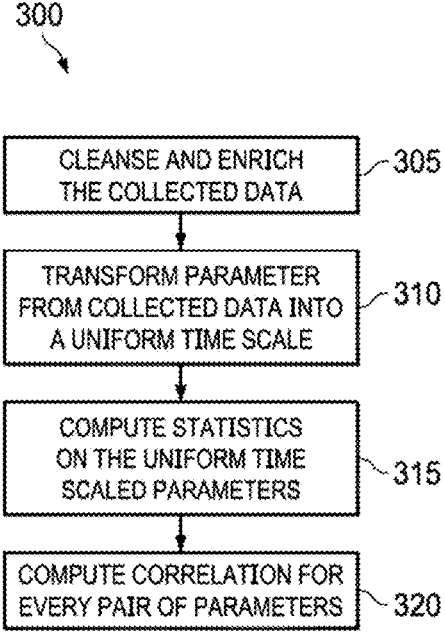
FIG. 3 illustrates an example method for data preparation and correlation according to this disclosure.

FIG. 3 illustrates an example method 300 for data preparation and correlation according to this disclosure. For ease of explanation, the method 300 is described with respect to the process facility system 100 shown in FIG. 1. In particular, the method 300 is described as being performed by the controller 138. However, the method 300 could be used in any suitable system and performed by any suitable device(s) or component(s).

In operation 305, the controller 138 cleanses and enriches the collected data. Repetitive data samples are combined and noted to reduce the total amount data to be analyzed. Parameters with no variance or non-numeric values can be removed to further reduce the total amount of data. The data is enriched due to the reduction of variables to process attributed to the equipment or process failures. A program such as MAPREDUCE can be used for operation 305.

In operation 310, the controller 138 transforms parameters from the collected data into a uniform time scale. Because the data collected from the sensors can be stored at differing time intervals, certain data requires scaling to a uniform time scale in order for the system to be properly analyzed. Examples of different uniform time scales include every 5 minutes, 15 minutes, hour, etc. The controller 138 aggregates for different time-steps and handles missing data.

In operation 315, the controller 138 computes statistics on the uniform time scaled parameters. The statistics could include, for example, the mean, variance, time steps, etc.

Figure 5:
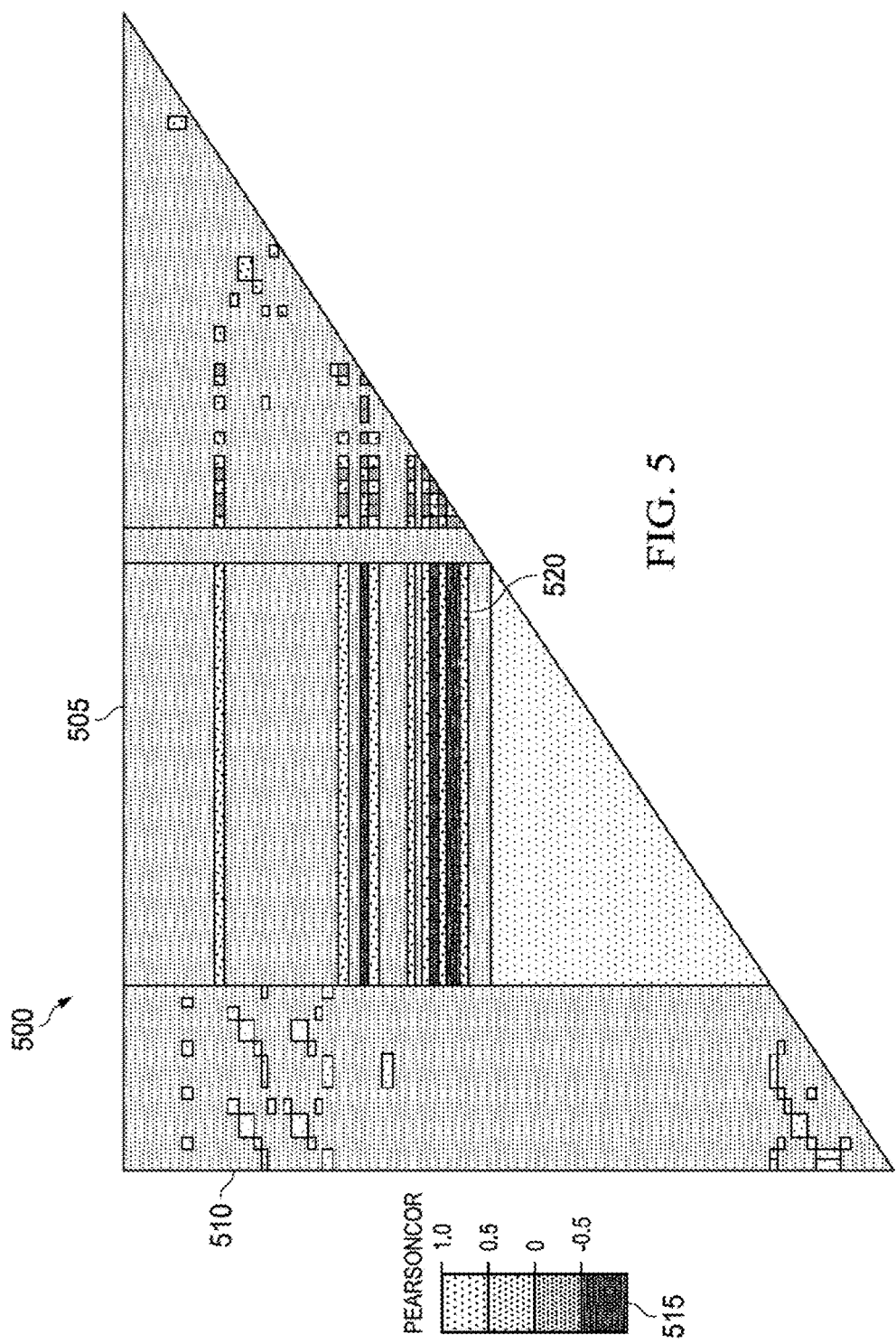
FIG. 5 illustrates an example heatmap of correlation between various parameters according to this disclosure.

In operation 320, the controller 138 computes correlations for every pair of parameters. The correlations can indicate the strength and direction of the interaction between parameters. An example correlation is illustrated in FIG. 5. The correlations between parameters can also be further cleansed and enriched for optimally analyzing the data. The cleansing and enriching of the data can also be performed by MAPREDUCE.

Although FIG. 3 illustrates one example of a method 300 for data preparation and correlation, various changes may be made to FIG. 3. For example, while shown as a series of steps, various steps shown in FIG. 3 could overlap, occur in parallel, or occur multiple times. Moreover, some steps could be combined or removed and additional steps could be added.

Figure 4:
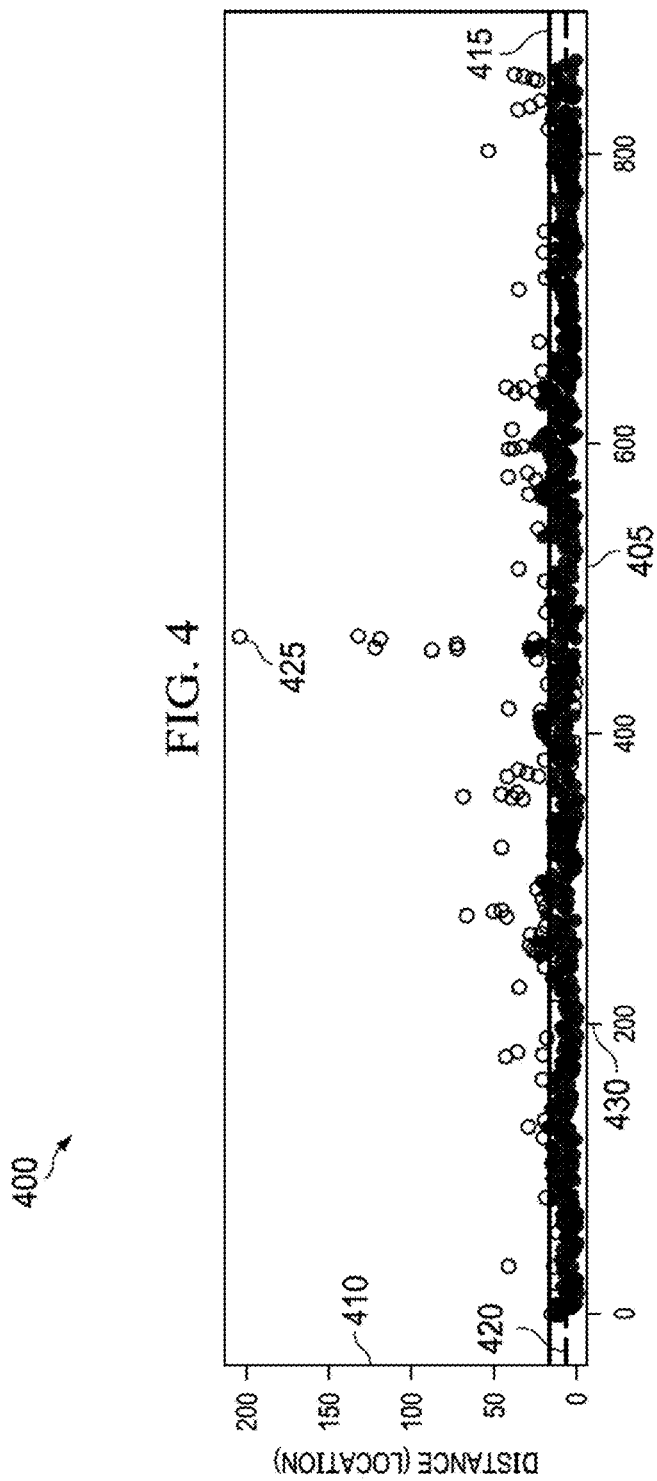
FIG. 4 illustrates an example anomaly detection graph according to this disclosure.

FIG. 4 illustrates an example anomaly detection graph 400 according to this disclosure. The anomaly detection graph 400 includes a time axis 405, a variable axis 410, a threshold 415, an average 420, and a plurality of data points 425.

The anomaly detection graph 400 includes a time axis 405 that displays the amount of time and time intervals 430 of the collected data. As depicted in FIG. 4, more than one data point can be taken in each time interval 430. The amount of time and time interval 430 are for illustration only and could be more or less than what is illustrated in FIG. 4.

The anomaly detection graph 400 also includes a variable axis 410 that defines the threshold 415 and the average 420. In the illustration of FIG. 4, the variable axis 410 measures a distance or location of the data points 425. The variable axis 410 can represent any type of measurement including, pressure, temperature, area, etc. The average 420 is a visual representation of the mean of the data points 425. The threshold 415 represents the value of the measurement for regular functioning equipment or processes. The threshold 415 can be determined based on past noted failures or based on a statistical deviation of the data points 425.

Although FIG. 4 illustrates one example of an anomaly detection graph 400, various changes may be made to FIG. 4. For example, the measurement components of the anomaly detection graph 400 are for illustration only. Various components in FIG. 4 could be omitted, combined, or further subdivided and additional components could be added according to particular needs.

FIG. 5 illustrates an example correlation heatmap 500 according to this disclosure. The correlation heatmap 500 includes a first axis 505, a second axis 510, and a correlation legend 515. The first axis 505 and second axis 510 both include all the parameters that are correlated. The intersection 520 of each parameter on the correlation heatmap 500 is colored based on the correlation. The colors are compared to the correlation legend to determine the correlation between the parameters. As illustrated the correlation can be either positive or negative. A positive correlation represents a direct relationship between the parameters, and a negative correlation represents an inverse relationship between the parameters.

Although FIG. 5 illustrates one example of a correlation heatmap 500, various changes may be made to FIG. 5. For example, the parameters of the correlation heatmap 500 are for illustration only. Various components in FIG. 5 could be omitted, combined, or further subdivided and additional components could be added according to particular needs.

Figure 6:
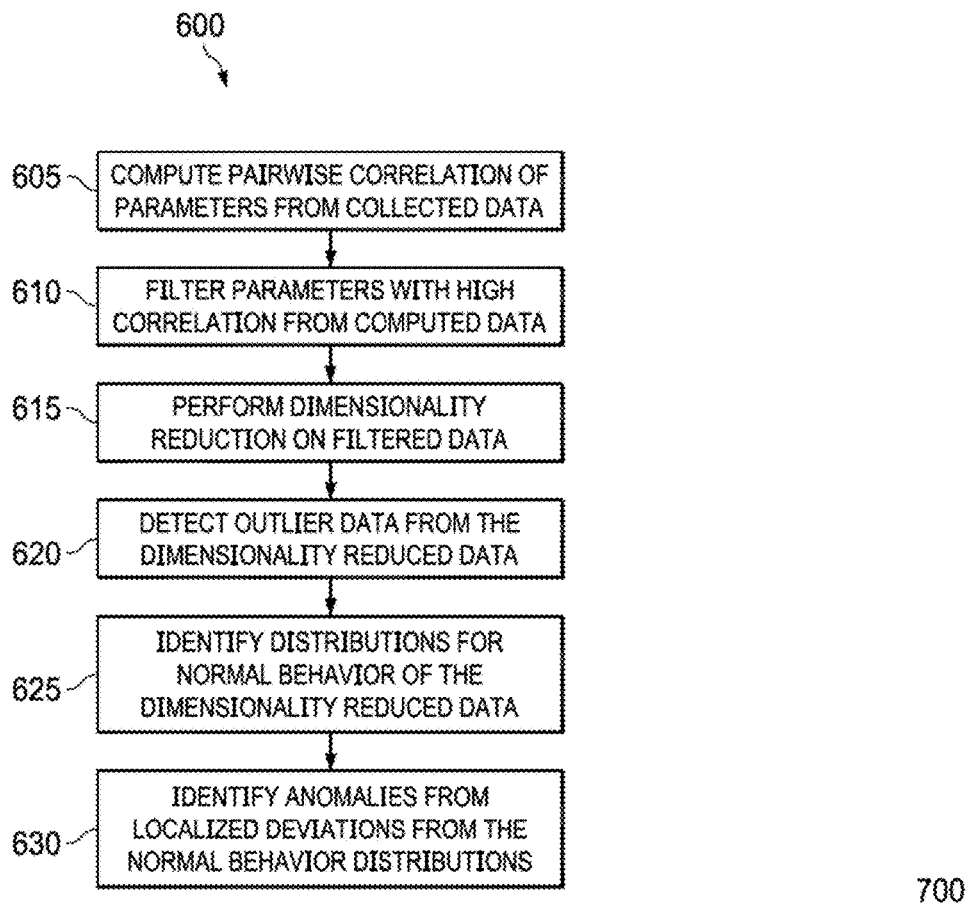
FIG. 6 illustrates an example method for unsupervised learning according to this disclosure.

FIG. 6 illustrates an example method 600 for unsupervised learning according to this disclosure. For ease of explanation, the method 600 is described with respect to the process facility system 100 shown in FIG. 1. In particular, the method 600 is described as being performed by the controller 138. However, the method 600 could be used in any suitable system and performed by any suitable device(s) or component(s).

In operation 605, the controller 138 computes a pairwise correlation of parameters from the collected data. The correlations can indicate the strength and direction of the interaction between parameters.

In operation 610, the controller 138 filters the parameters with a high correlation from the computed data. The parameters with high correlations can be cleansed and enriched for optimally analyzing the data. The cleansing and enriching of the data can also be performed by MAPREDUCE.

In operation 615, the controller 138 performs dimensionality reduction on the filtered data. The controller 138 reduces the amount of variables under consideration that are determined to not affect a specific piece of equipment or process being analyzed. An example of a selection technique to perform dimensionality reduction includes principal component analysis (PCA).

In operation 620, the controller 138 detects outlier data from the dimensionality reduced data. The data can be determined to be an outlier when a data point 425 is outside a certain multiple of standard deviation from other data points or can be determined based on a properly functioning piece of equipment or process.

In operation 625, the controller 138 identifies distributions for normal behavior of the dimensionality reduced data. The controller 138 determines a threshold 415 and an average 420 for each of the variables involved for each piece of equipment or process.

In operation 630, the controller 138 identifies anomalies from the localized deviations from the normal behavior distributions. Data points 425 that are above the threshold 415 identify anomalies in the equipment or process. The controller 138 can be configured to require identifying more than one data point to confirm an anomaly. The controller 138 can also use a calculation to determine if the data point deviations collectively are an amount outside the threshold to not be considered outlier data.

Although FIG. 6 illustrates one example of a method 600 for unsupervised learning in a field device, various changes may be made to FIG. 6. For example, while shown as a series of steps, various steps shown in FIG. 6 could overlap, occur in parallel, or occur multiple times. Moreover, some steps could be combined or removed and additional steps could be added.

Figure 7:
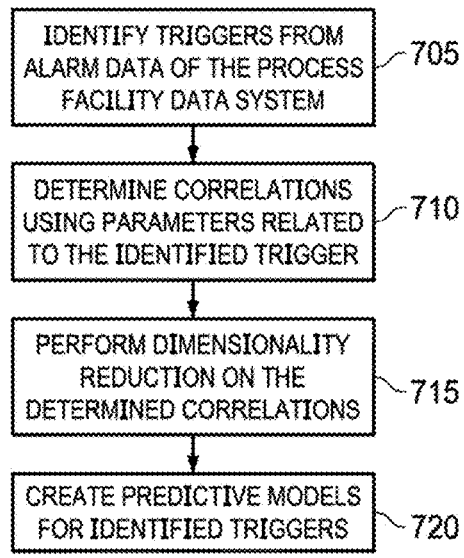
FIG. 7 illustrates an example method for supervised learning according to this disclosure.

FIG. 7 illustrates an example method 700 for supervised learning according to this disclosure. For ease of explanation, the method 700 is described with respect to the process facility system 100 shown in FIG. 1. In particular, the method 700 is described as being performed by the controller 138. However, the method 700 could be used in any suitable system and performed by any suitable device(s) or component(s).

In operation 705, the controller 138 identifies triggers from alarm data of the process facility system data. The controller 138 can determine the data from sensors 102a that contain spikes in sensor measurements both at the time of the alarm and before the alarm. Variables that do not indicate any measurable difference in readings at the time of the alarm or shortly before the alarm are determined to not be triggers and unrelated to the alarm.

In operation 710, the controller 138 determines the correlations using the parameters related to the identified triggers. Spikes in one or more measurements can indicate correlations. Relationships between measurements and the alarms are determined to identify the impact of the measurements from each sensor and the severity of each trigger.

In operation 715, the controller 138 performs dimensionality reductions on the determined correlations. The controller 138 reduces the amount of variables under consideration that are determined to not affect a specific piece of equipment or process being analyzed. An example of a selection technique to perform dimensionality reduction includes random forest, Lasso, and relaxo.

In operation 720, the controller 138 creates a predictive model for the identified triggers. The predictive model is used to detect failures or abnormal conditions of a piece of equipment or process before the current alarms used or built-in to the sensors or equipment. The predictive models use the alarm triggers to determine the leading indicators for alarms.

Although FIG. 7 illustrates one example of a method 700 for supervised learning, various changes may be made to FIG. 7. For example, while shown as a series of steps, various steps shown in FIG. 7 could overlap, occur in parallel, or occur multiple times. Moreover, some steps could be combined or removed and additional steps could be added.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism,"

"module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a memory; and
   one or more processors operably connected to the memory, the one or more processors configured to:
      receive data collected from a field device or a process in a process facility system;
      compute a pairwise correlation of parameters from the collected data indicating a strength and a direction of an interaction between each pair of parameters;
      filter the parameters with the pairwise correlation having the strength and the direction outside of a range;
      detect an anomaly based on the filtered parameters for an unsupervised failure of the field device or the process, wherein the unsupervised failure is a failure that is not monitored by alarms with an alarm;
      detect a leading indicator based on the filtered parameters for a supervised failure of the field device or the process, wherein the supervised failure is a failure monitored with the alarm; and
      monitor current data collected from the process facility system for the anomaly and the leading indicator before a future unsupervised failure or a future supervised failure occurs.

2. The apparatus of claim 1, wherein to detect the anomaly, the one or more processors are further configured to:
   extract time series data from the collected data;
   convert the collected data to a regularized time series;
   apply a correlation to reduce dimensionality of the collected data converted to the regularized time series;
   detect outlier data from the collected data; and
   identify a distribution for normal behavior from the collected data after the outlier data is removed.

3. The apparatus of claim 2, wherein to monitor the current data collected for the anomaly before the future unsupervised failure occurs, the one or more processors are further configured to identify the anomaly from the normal behavior distribution.

4. The apparatus of claim 2, wherein:
   the correlation comprises a Pearson correlation, and
   a principal component analysis is used to detect the outlier data.

5. The apparatus of claim 1, wherein to detect the leading indicator, the one or more processors are further configured to:
   identify a trigger from alarm data of the process facility system;
   determine one or more correlations using parameters related to the identified trigger;
   perform dimensionality reduction on the determined one or more correlations; and
   create a predictive model for the identified trigger.

6. The apparatus of claim 5, wherein to monitor the current data collected for the leading indicator before the future supervised failure occurs, the one or more processors are further configured to deploy the leading indicator for the alarm from the predictive model.

7. The apparatus of claim 5, wherein a selection technique for performing dimensionality reduction is one of: random forest or lasso.

8. A method comprising:
   receiving data collected from a field device or a process in a process facility system;
   computing a pairwise correlation of parameters from the collected data indicating a strength and a direction of an interaction between each pair of parameters;
   filtering the parameters with the pairwise correlation having the strength and the direction outside of a range;
   detecting an anomaly based on the filtered parameters for an unsupervised failure of the field device or the process, wherein the unsupervised failure is a failure that is not monitored with an alarm;
   detecting a leading indicator based on the filtered parameters for a supervised failure of the field device or the process, wherein the supervised failure is a failure monitored with the alarm; and
   monitoring current data collected from the process facility system for the anomaly and the leading indicator before a future unsupervised failure or a future supervised failure occurs.

9. The method of claim 8, wherein detecting the anomaly further comprises:
   extracting time series data from the collected data;
   converting the collected data to a regularized time series;
   applying a correlation to reduce dimensionality of the collected data converted to the regularized time series;
   detecting outlier data from the collected data; and
   identifying a distribution for normal behavior from the collected data after the outlier data is removed.

10. The method of claim 9, wherein monitoring the current data collected for the anomaly before the future unsupervised failure occurs comprises identifying the anomaly from the normal behavior distribution.

11. The method of claim 9, wherein:
   the correlation comprises a Pearson correlation, and a principal component analysis is used to detect the outlier data.

12. The method of claim 8, wherein detecting the leading indicator comprises:
   identifying a trigger from alarm data of the process facility system;
   determining one or more correlations using parameters related to the identified trigger;
   performing dimensionality reduction on the determined one or more correlations; and
   creating a predictive model for the identified trigger.

13. The method of claim 12, wherein monitoring the current data collected for the leading indicator before the future supervised failure occurs comprises deploying the leading indicator for the alarm from the predictive model.

14. The method of claim 12, wherein a selection technique for performing dimensionality reduction is one of: random forest or lasso.

15. A non-transitory machine-readable medium encoded with executable instructions that, when executed, cause one or more processors to:
   receive data collected from a field device or a process in a process facility system;
   compute a pairwise correlation of parameters from the collected data indicating a strength and a direction of an interaction between each pair of parameters;
   filter the parameters with the pairwise correlation having the strength and the direction outside of a range;
   detect an anomaly based on the filtered parameters for an unsupervised failure of the field device or the process, wherein the unsupervised failure is a failure that is not monitored with an alarm;
   detect a leading indicator based on the filtered parameters for a supervised failure of the field device or the process, wherein the supervised failure is a failure monitored with the alarm; and
   monitor current data collected from the process facility system for the anomaly and the leading indicator before a future unsupervised failure or a future supervised failure occurs.

16. The non-transitory machine-readable medium of claim 15, wherein the instructions to detect the anomaly further comprise instructions to:
   extract time series data from the collected data;
   convert the collected data to a regularized time series;
   apply a correlation to reduce dimensionality of the collected data converted to the regularized time series;
   detect outlier data from the collected data; and
   identify a distribution for normal behavior from the collected data after the outlier data is removed.

17. The non-transitory machine-readable medium of claim 16, wherein the instructions to monitor the current data collected for the anomaly before the future unsupervised failure occurs comprise instructions to identify the anomaly from the normal behavior distribution.

18. The non-transitory machine-readable medium of claim 16, wherein:
   the correlation comprises a Pearson correlation, and
   a principal component analysis is used to detect the outlier data.

19. The non-transitory machine-readable medium of claim 15, wherein the instructions to detect the leading indicator comprise instructions to:
   identify a trigger from alarm data of the process facility system;
   determine one or more correlations using parameters related to the identified trigger;
   perform dimensionality reduction on the determined one or more correlations; and
   create a predictive model for the identified trigger.

20. The non-transitory machine-readable medium of claim 19, wherein the instructions to monitor the current data for the leading indicator before the future supervised failure occurs comprise instructions to deploy the leading indicator for the alarm from the predictive model.

* * * * *